(12) United States Patent
Iyer et al.

(10) Patent No.: US 11,424,608 B2
(45) Date of Patent: Aug. 23, 2022

(54) DEVICES AND METHODS FOR ELECTRICAL CABLE SPLICES

(71) Applicant: nVent Services GmbH, Schaffhausen (CH)

(72) Inventors: Ganpathy Iyer, Sunnyvale, CA (US); Paul Becker, San Carlos, CA (US); David Parman, San Ramon, CA (US)

(73) Assignee: nVent Services GmbH, Schaffhausen (CH)

(*) Notice: Subject to any disclaimer, the term of this patent is extended or adjusted under 35 U.S.C. 154(b) by 3 days.

(21) Appl. No.: 17/179,200

(22) Filed: Feb. 18, 2021

(65) Prior Publication Data

US 2021/0257824 A1 Aug. 19, 2021

Related U.S. Application Data

(60) Provisional application No. 62/978,170, filed on Feb. 18, 2020.

(51) Int. Cl.
*H02G 15/10* (2006.01)
*H02G 15/18* (2006.01)
*H01R 4/2475* (2018.01)
*H05B 3/08* (2006.01)
(Continued)

(52) U.S. Cl.
CPC ............ *H02G 15/18* (2013.01); *H01R 4/2475* (2013.01); *H02G 15/10* (2013.01); *H05B 3/08* (2013.01); *H05B 3/52* (2013.01); *H05B 3/56* (2013.01)

(58) Field of Classification Search
CPC . H01B 7/02; H01B 9/02; H01B 13/06; H01R 4/2475; H01R 5/02; H01R 4/70; H01R 13/52; H01R 43/26; H02G 15/10; H02G 15/184; H02G 15/013; H02G 15/18;
(Continued)

(56) References Cited

U.S. PATENT DOCUMENTS

| | | | |
|---|---|---|---|
| 3,656,084 A | * | 4/1972 | Malia ............. H02G 15/103 439/88 |
| 3,691,505 A | | 9/1972 | Graves |
| 3,692,922 A | | 9/1972 | Sugimoto et al. |

(Continued)

FOREIGN PATENT DOCUMENTS

| | | |
|---|---|---|
| EP | 0435569 A1 | 3/1991 |
| EP | 0424090 A2 | 4/1991 |

(Continued)

OTHER PUBLICATIONS 3M catalog pp. 311-376, p. 347, 3M Cold Shrink Branch Cable Splice QS2001B, undated, 66 pages.

(Continued)

*Primary Examiner* — William H. Mayo, III
(74) *Attorney, Agent, or Firm* — Quarles & Brady LLP

(57) ABSTRACT

A splice for a skin-effect effect heating cable including a primary shim configured to be shrunk over part of an insulation layer of a first portion of the heating cable, a secondary shim configured to be shrunk part of the insulation layer of a second portion of the heating cable, a connector configured to electrically couple the first portion of the heating cable and the second portion of the heating cable, and an outer cold shrink tube configured to be shrunk over the primary shim, the secondary shim, and the connector.

20 Claims, 13 Drawing Sheets

(51) Int. Cl.
*H05B 3/52* (2006.01)
*H05B 3/56* (2006.01)

(58) Field of Classification Search
CPC ...... H02G 15/1826; H02G 15/24; H02B 3/08;
H02B 3/52; H02B 3/56
USPC ....... 156/49, 56; 174/47, 73 SC, 84 R, 88 C,
174/88 R, 102 R, 102 SC, 105 SC,
174/106 SC, 120 SC; 219/10.51, 300,
219/301
See application file for complete search history.

(56) References Cited

U.S. PATENT DOCUMENTS

| | | | |
|---|---|---|---|
| 3,717,717 A | 2/1973 | Cunningham et al. | |
| 4,034,151 A | 7/1977 | Silva et al. | |
| 4,383,131 A | 5/1983 | Clabburn | |
| 4,388,523 A | 6/1983 | Keep, Jr. et al. | |
| 4,436,565 A * | 3/1984 | Weitzel | H05B 3/0004 |
| | | | 428/377 |
| 4,496,795 A | 1/1985 | Konnik | |
| 4,532,375 A * | 7/1985 | Weitzel | H05B 3/0004 |
| | | | 174/106 SC |
| 4,617,449 A * | 10/1986 | Weitzel | H05B 3/0004 |
| | | | 219/605 |
| 4,831,214 A | 5/1989 | Wilck | |
| 5,486,388 A | 1/1996 | Portas et al. | |
| 5,801,332 A | 9/1998 | Berger et al. | |
| 6,147,308 A | 11/2000 | Santagata | |
| 6,997,758 B2 | 2/2006 | De Buyst et al. | |
| 7,180,040 B2 | 2/2007 | Jones | |
| 7,476,114 B1 * | 1/2009 | Contreras | H01R 4/70 |
| | | | 439/796 |
| 7,863,521 B2 | 1/2011 | Campbell et al. | |
| 7,901,243 B1 * | 3/2011 | Yaworski | H02G 5/007 |
| | | | 439/523 |
| 8,030,570 B2 | 10/2011 | Seraj et al. | |
| 8,324,502 B2 | 12/2012 | Kameda et al. | |
| 8,445,783 B2 | 5/2013 | Taylor et al. | |
| 8,502,076 B2 | 8/2013 | Luzzi | |
| 8,981,224 B2 | 3/2015 | Kehl et al. | |
| 9,059,581 B2 | 6/2015 | Luzzi | |
| 9,178,289 B2 * | 11/2015 | Seraj | H01R 43/26 |
| 9,392,709 B2 | 7/2016 | Luzzi | |
| 9,425,605 B2 | 8/2016 | Yaworski | |
| 9,504,195 B2 | 11/2016 | Dinu et al. | |
| 9,779,857 B2 | 10/2017 | Seraj | |
| 9,780,549 B2 | 10/2017 | Yaworski et al. | |
| 10,411,456 B2 | 9/2019 | Yaworski | |
| 2004/0209025 A1 | 10/2004 | Kobayashi et al. | |
| 2010/0181099 A1 * | 7/2010 | Kameda | H02G 15/1833 |
| | | | 156/48 |
| 2010/0279542 A1 * | 11/2010 | Seraj | H01R 4/72 |
| | | | 439/502 |
| 2011/0011484 A1 | 1/2011 | Evoniuk et al. | |
| 2013/0295790 A1 * | 11/2013 | Cornelius | H01R 11/11 |
| | | | 29/869 |
| 2014/0262500 A1 * | 9/2014 | Yaworski | H02G 1/14 |
| | | | 174/84 R |
| 2014/0338953 A1 * | 11/2014 | Seraj | H02G 15/1826 |
| | | | 174/138 F |
| 2015/0334887 A1 * | 11/2015 | Dinu | H02G 15/1833 |
| | | | 174/106 SC |

FOREIGN PATENT DOCUMENTS

| | | | | |
|---|---|---|---|---|
| KR | 100830879 B1 | 5/2008 | | |
| KR | 10-1954140 B1 | 3/2019 | | |
| WO | 2009000117 A1 | 12/2008 | | |
| WO | WO 2010/083085 A2 * | 7/2010 | | H02G 15/18 |
| WO | 2014189567 A2 | 11/2014 | | |

OTHER PUBLICATIONS

3M™ QS200 22kV Col-Shrink Inline Joint with Cold-Shrink rejacketing, including connectors, datasheet, Copyright 3M 2010, Sep. 2010, Issue 1, 2 pages.

* cited by examiner

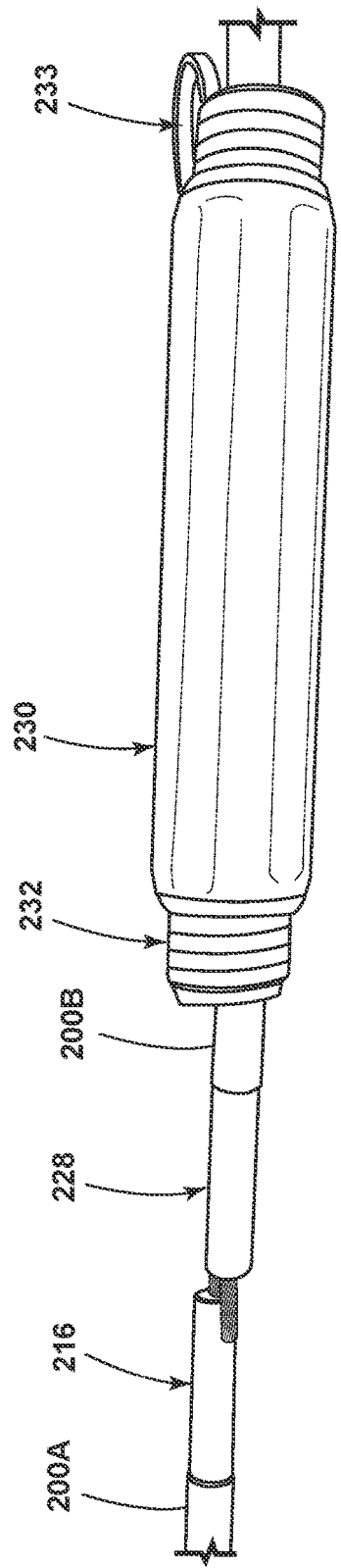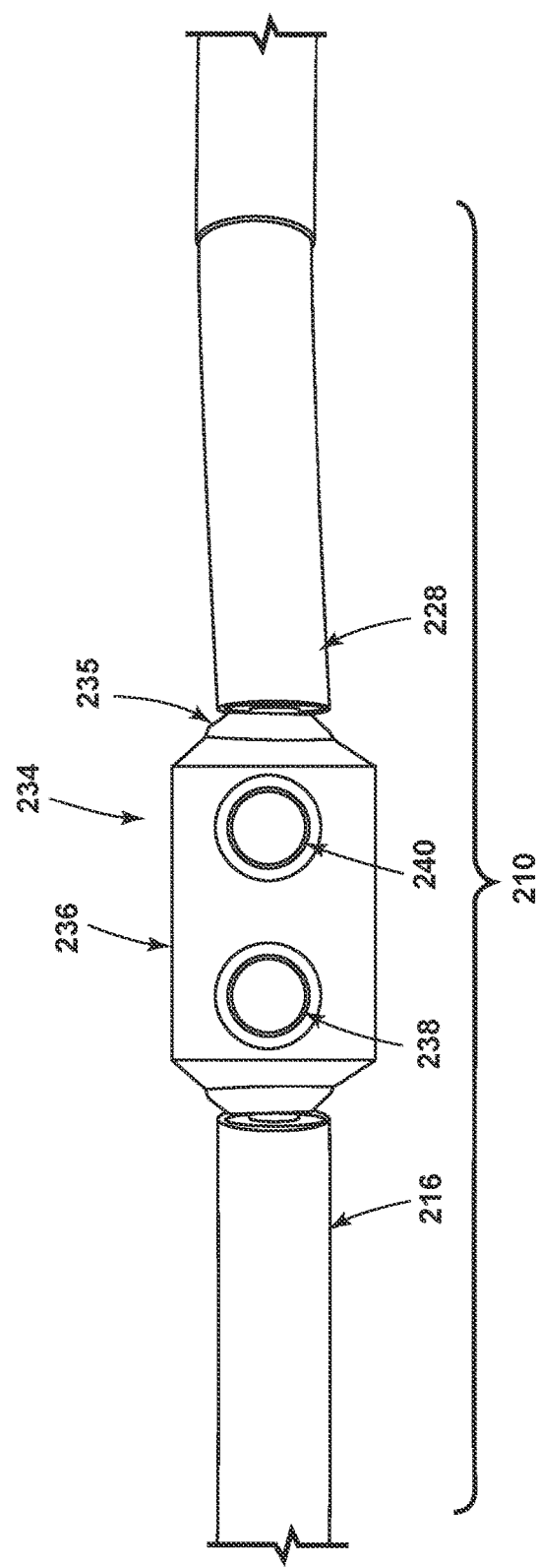
FIG. 5
FIG. 6

DEVICES AND METHODS FOR ELECTRICAL CABLE SPLICES

RELATED APPLICATIONS

This application claims priority to U.S. Provisional Application No. 62/978,170, filed Feb. 18, 2020, which is incorporated by reference herein in its entirety.

BACKGROUND

During construction or repair of electrical systems, it may be necessary to join two cables together. In some applications, heat shrink splices that utilize heat shrink tubing can be used to join the two cables together. More specifically, heat shrink splices can be used for joining together the conductors of the two cables. For example, heat shrink splices can utilize soldering methods or mechanical methods such as crimp connections. Once the conductors are joined together, there may be exposed wires or mechanical connectors in between insulated sections of the two cables. The exposed section can be covered with heat shrink tubing, which can provide a barrier against moisture as well as electrical insulation.

Another option to join cables in some applications is cold shrink splices. Cold shrink splices can include pre-expanded tubing that collapses and shrinks around the cables and connector, and conforms to the outer surface of the cables and connector. The pre-expanded tubing, which is generally circular, may not shrink past a predetermined shape. Other options to join cables can utilize push-on splices that comprise materials including rubber. Still other splices may utilize tapes such as self-fusing tapes.

SUMMARY

The present disclosure addresses the need for an easily installable, high-temperature resistant splice for certain high voltage cables such as high voltage, in-line, skin-effect heating cables. In one aspect, a splice system for a skin-effect effect heating cable having an insulation layer and comprising a first portion at least partially disposed in a first heating tube and a second portion at least partially disposed in a second heating tube is provided. The splice system includes a splice and a pull box. The splice includes a primary cold shrink shim shrunk over a first length of the insulation layer of the first portion of the heating cable and a secondary cold shrink shim shrunk over a second length of the insulation layer of the second portion of the heating cable. The splice also includes a connector electrically coupled to a first conductor of the first portion of the heating cable and a second conductor of the second portion of the heating cable, and an outer cold shrink tube comprising an outer semiconductive layer. The outer cold shrink tube is shrunk over the primary shim, the secondary shim, and the connector. The metallic pull box is welded to and in electrical communication with the first heating tube and the second heating tube, the metallic pull box housing the splice, and in electrical communication with the outer semiconductive layer of the outer cold shrink tube.

In another aspect, a splice for a skin-effect effect heating cable including an insulation layer and disposed in a heating tube is provided. The splice includes a primary cold shrink shim, a secondary cold shrink shim, a connector, and an outer cold shrink tube. The primary cold shrink shim is shrunk over a first length of the insulation layer of a first portion of the heating cable. The secondary cold shrink shim is shrunk over second length of the insulation layer of a second portion of the heating cable. The connector is electrically coupled to a conductor of the first portion of the heating cable and a conductor of the second portion of the heating cable. The outer cold shrink tube is shrunk over the primary shim, the secondary shim, and the connector, and in electrical contact with a metallic pull box in electrical communication with the heating tube.

In yet another aspect, a method for installing a cold shrink splice on a skin effect heating cable is provided. The method includes removing an outer semiconductive layer along a first portion of the heating cable to expose a first length of an insulation layer of the heating cable, and installing a primary shim over at least a portion of the first length of the insulation layer. The method also includes removing the outer semiconductive layer along a second portion of the heating cable to expose a second length of the insulation layer of the heating cable and installing a secondary shim over at least a portion of the second length of the insulation layer. The method further includes installing a cold shrink tube over the primary shim and the secondary shim, and placing the cold shrink tube in electrical contact with a pull box.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DESCRIPTION OF THE DRAWINGS

FIG. 5 is an isometric view of the primary shim and a secondary shim of FIG. 4, and an outer cold shrink tube included in the splice of FIG. 3.

FIG. 6 is a side view of a connector included in the splice of FIG. 3.

DETAILED DESCRIPTION

Figure 1:
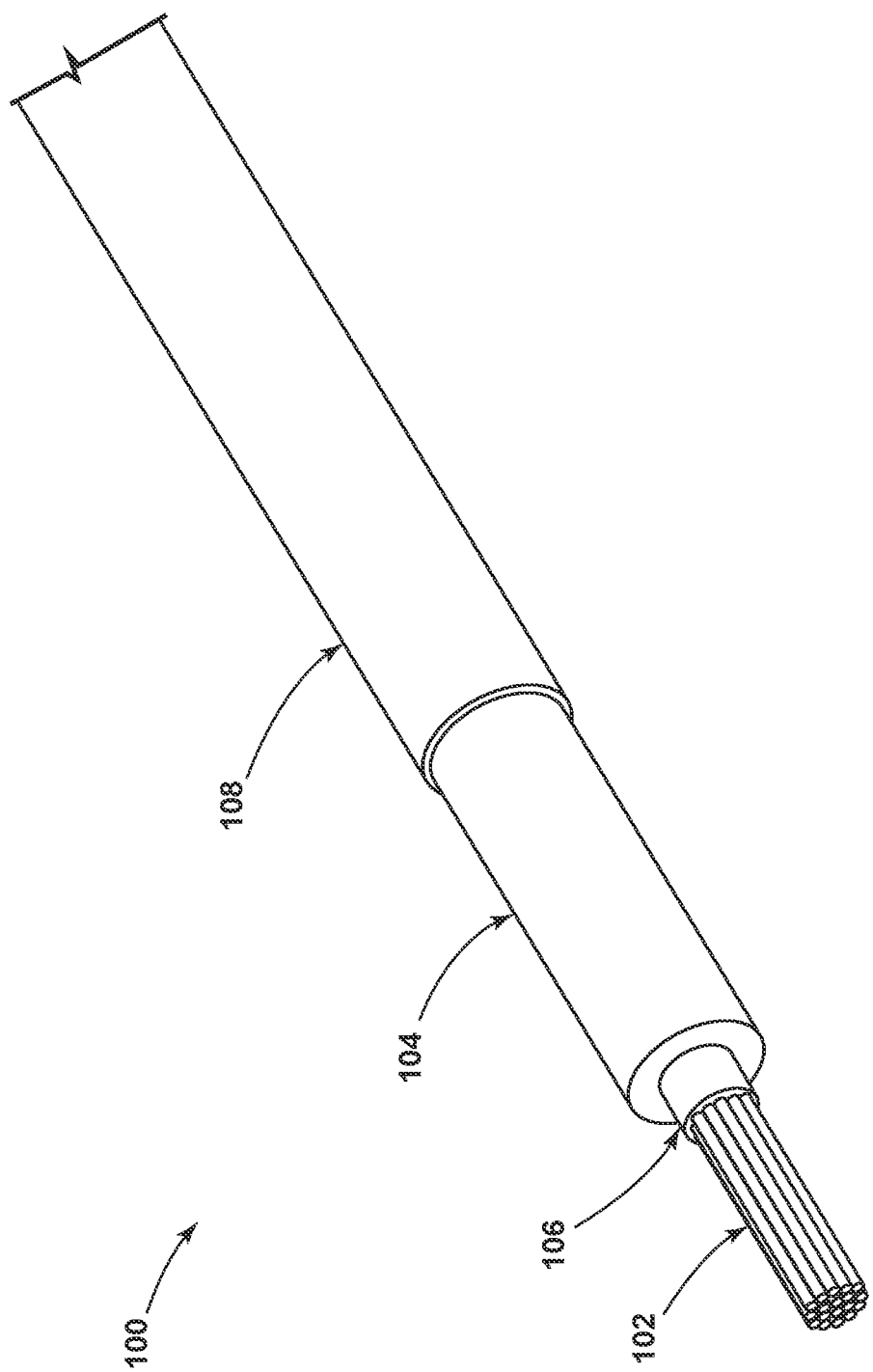
FIG. 1 is an isometric view of a heater cable.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an exemplary heater cable 100 in accordance with various embodiments. The heater cable 100 can be a skin-effect heating cable, configured to be in contact with a heat tube. For example, in a skin-effect heating system, heat is generated along a heat tube that is thermally coupled to a pipe to be heat traced. The heater cable 100 is installed inside the heat tube and connected to the heat tube at one end. An alternating current (AC) is passed through the heater cable 100 and returns through the heat tube, resulting in heat generation. The heater cable 100 can be a high voltage heating cable, for example, operating at a nominal five thousand volts, ten thousand volts, or higher.

The illustrated heater cable 100 is shown in FIG. 1 with each layer subsequently stripped to clearly illustrate its layered construction in accordance with at least one embodiment. As shown in FIG. 1, the heater cable 100 includes a conductor 102 at its core, an electrical insulation layer 104, an optional inner semiconductive layer 106, and an outer semiconductive layer 108.

The conductor 102 can be of any suitable conductive material including tinned copper, nickel plated copper, aluminum, steel, gold, platinum, silver, and others. The conductor 102 may be a solid conductor wire or may be stranded wire. The conductor 102 can be a #4 (i.e., 4 American wire gauge or 4 AWG or equivalent) sized conductor. In some embodiments, the conductor 102 might be smaller than a #4 sized conductor. In some embodiments, the conductor 102 may be a #2 (i.e., 2 American wire gauge or 2 AWG or equivalent) sized conductor or smaller.

The conductor 102 is encapsulated within the electrical insulation layer 104. The non-conducting electrical insulation layer 104 may be of any suitable material including silicone, PFA, EPDM rubber, XPLE, and others. Certain materials such as silicone and PFA may have greater heat resistance properties than other materials, and may therefore be more desirable in applications that require high temperature resistance.

In some embodiments, the circumference of the conductor 102 is entirely in physical contact with the electrical insulation layer 104. In other embodiments, as shown in FIG. 1, the conductor 102 is encapsulated in or in direct electrical contact with the inner semiconductive layer 106. In such embodiments, the inner semiconductive layer 106 is then encapsulated within the electrical insulation layer 104.

The outer semiconductive layer 108 surrounds the electrical insulation layer 104. The outer semiconductive layer 108 may be any suitable semiconductive material, combination of semiconductive materials, or semiconductive combination of electrically insulating material(s) with conductive material(s). In some embodiments, the outer semiconductive layer 108 can be the same base material as the insulation (e.g. silicone, PFA etc.) but can be mixed, doped, or otherwise loaded with carbon black or another conductive material to render the layer 108 semiconductive. More specifically, and as further described herein, the composition of the outer semiconductive layer 108 can be selected so that the outer semiconductive layer 108, which contacts the inner surface of the heat tube being heated, reduces or eliminates corona or partial discharge without interfering with the electrical relationship between the heater cable 100 and the heat tube that enables skin-effect heating. Thus, the resistivity of the material comprising the outer semiconductive layer 108 may be low enough to reduce or eliminate corona at the outer surface of the heater cable 100. In particular, the resistivity may be low enough to prevent corona discharge even at locations along the length of the heater cable 100 where the heater cable 100 is not continuously in contact with the cooperating heat tube.

Furthermore, the resistivity of the outer semiconductive layer 108 may be high enough that the return alternating current, flowing along the inner surface of a cooperating heat tube in the opposite direction to alternating current in the conductor 102, does not flow substantially into the outer semiconductive layer 108. In particular, it is understood that the heat tube's transmission of the return skin-effect current may contribute more than half (typically about 70%) of the thermal energy in the skin-effect trace heating system (the heater cable 100 contributes the remainder of the thermal energy); the outer semiconductive layer 108 may have a resistivity that only allows, at most, an insignificant portion of the return current to flow into or through the outer semiconductive layer 108, so that skin-effect heating of the heat tube is not disrupted. For example, the outer semiconductive layer 108 may divert less than about 1% of the return current from the inner surface of the heat tube.

In various embodiments that minimize or eliminate both corona discharge and heat loss, the bulk resistivity of the outer semiconductive layer 108 can be between $10^1$ and $10^6$ ohm-cm, or between $10^0$ and $10^2$ ohm-cm, or between 5 and 50 ohm-cm, inclusive. Further, the bulk resistivity can be $10^9$ ohm-cm or higher in some embodiments while remaining beneficial. In some embodiments, the outer semiconductive layer 108 may be applied to the insulation layer 104 by a standard extrusion and/or co-extrusion process, and may have a minimum thickness of about 0.5 millimeters (mm). In other embodiments, the outer semiconductive layer 108 may be applied by other methods, such as wrapping a length of semiconductive tape around the insulation layer 104 to form the outer semiconductive layer 108. A suitable semiconductive tape may have a minimum thickness of about 0.1 mm. In any application method, the maximum suitable thickness of the outer semiconductive layer 108 can be limited by cost considerations, availability of material, ease of application, and damage resistance (e.g., from being pulled through the heat tube during installation). With respect to practical considerations, such as overall heater cable diameter and relative diameter to the inner diameter of the heat tube in which the heater cable 100 is installed, the outer semiconductive layer thickness may have an upper limit of between 5 mm and 10 mm, inclusive.

Referring now FIGS. 2-7, some embodiments provide a splice 210 (shown in FIGS. 6-7) for a heating cable 200. That is, the splice 210 can operate to electrically and physically connect a first portion 200a of a heating cable 200 to a second portion 200b of a heating cable 200 while still permitting proper skin-effect heating operation. The heating cable 200 can include a conductor 202 (shown in FIG. 3), an electrical insulation layer 204, and an outer semiconductive layer 208. In some embodiments, the heating cable 200 can be the same as, or substantially similar to, the heating cable 100 for skin effect heating in combination with a heat tube as described above with respect to FIG. 1. For example, the conductor 202 of the heating cable 200 can be substantially the same as the conductor 102 shown in FIG. 1 and described above. The electrical insulation layer 204 of the heating cable 200 can be substantially the same as the electrical insulation layer 104 shown in FIG. 1 and described above. The outer semiconductive layer 208 of the heating cable 200 can be substantially the same as the outer semiconductive layer 108 shown in FIG. 1 and described above. The heating cable 200 may also include an optional inner semiconductive layer 206 (shown in FIG. 3) that may be substantially the same as the optional inner semiconductive layer 106 shown in FIG. 1 and described above.

In some embodiments, the splice 210 includes at least one cold shrink tube, as further described below, and, thus, the splice 210 may be referred to as a cold shrink splice. For example, in some embodiments, the splice 210 can include a grease applicator 212 including grease 214, a primary shim 216 (e.g., a primary cold shrink shim), a secondary shim 228 (e.g., a secondary cold shrink shim), an outer cold shrink tube 230, and a connector 234.

Figure 2:
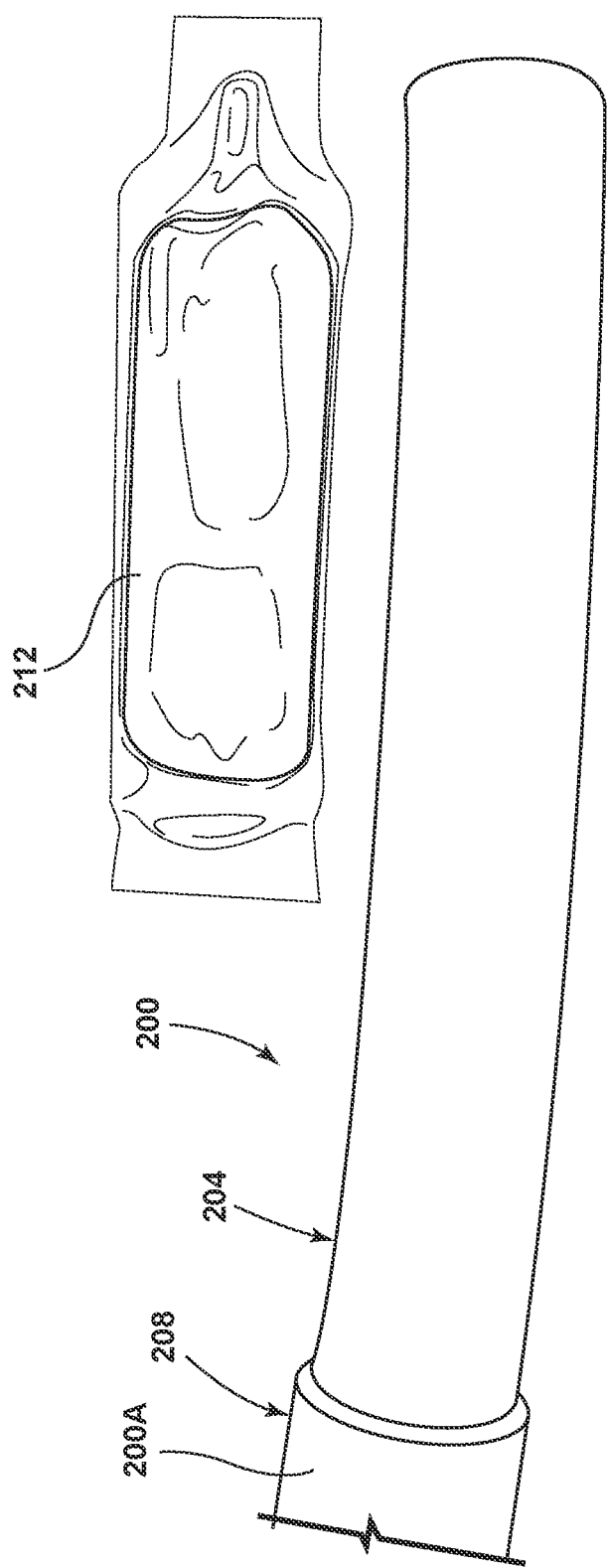
FIG. 2 is an isometric view of a heating cable and a grease applicator.

Referring specifically to FIG. 2, the heating cable 200 can include a first portion 200A. Along the first portion 200A, the outer semiconductive layer 208 can be removed by a qualified technician to expose a length of the electrical insulation layer 204. For example, the outer semiconductive layer 208 may be stripped back a predetermined minimum length (indicated by a cut end 224 in FIG. 3) so that arcing or surface tracking from the connection area of two portions of the cable 200 (as described below) to the outer semiconductive layer 208 does not occur.

Figure 3:
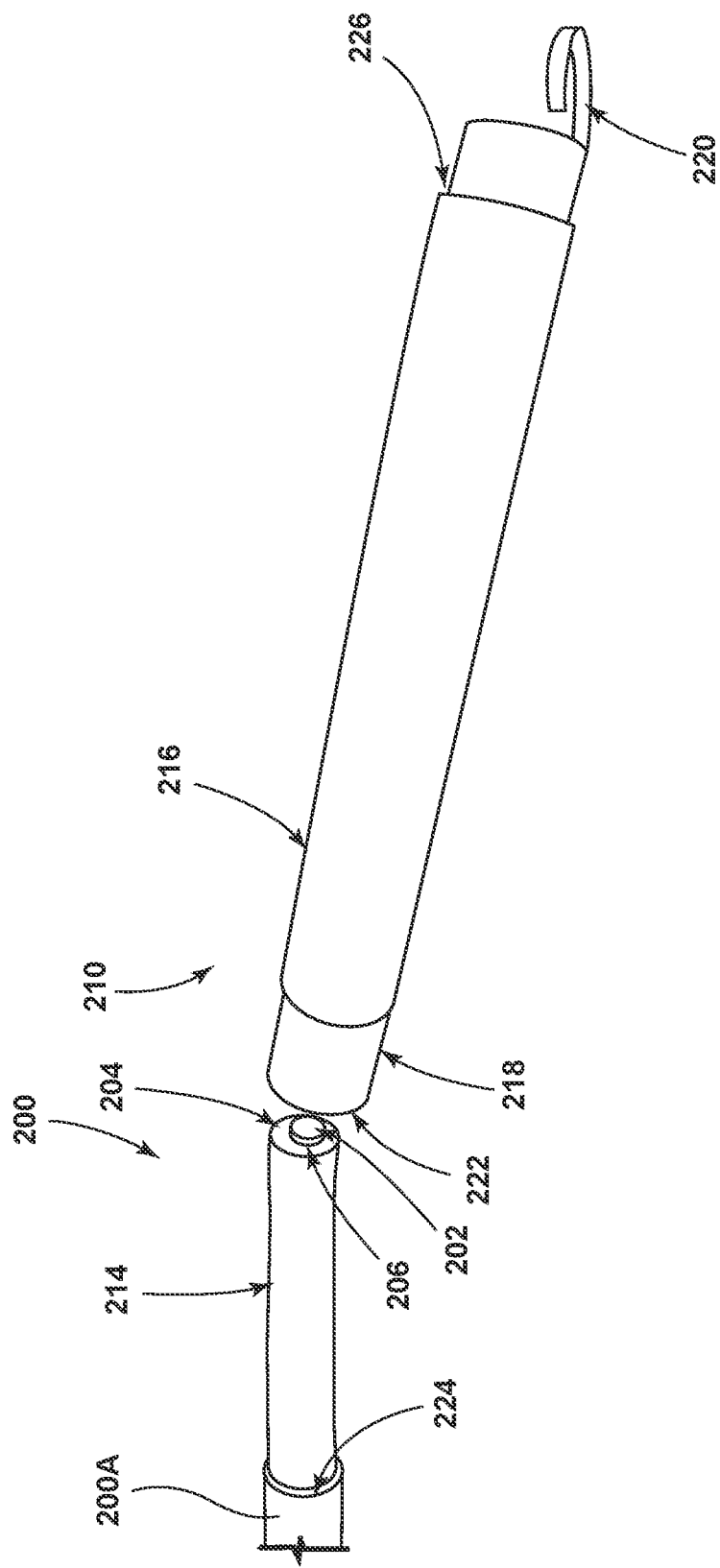
FIG. 3 is an isometric view of a first portion of the heating cable of FIG. 2 and a primary shim included in a splice according to some embodiments of the invention.

Referring to FIG. 2 as well as FIG. 3, grease 214 can be applied to at least a portion of the exposed length of electrical insulation layer 204 using a grease applicator 212. For example, the grease applicator 212 may be a tube or sleeve containing grease provided with the splice 210. The grease 214 can help to eliminate potential air pockets between the primary shim 216 and the electrical insulation layer 204 when the splice 210 is installed. For example, air pockets can increase the risk of electrical discharges, especially with cables that operate at about five thousand volts or higher.

As noted above, the splice 210 can include the primary shim 216. In some embodiments, the primary shim 216 can be a cold shrink tube such as a silicone cold shrink tube that has been preformed to a predetermined shape and then pre-expanded over an inner spiral hold out 218 (also referred to as an inner spiral). The inner spiral 218 can provide enough rigidity to hold the primary shim 216 out to an expanded position, and can be removed by the qualified technician pulling a ripcord portion 220, which will gradually unwind the inner spiral 218 from a first end 222 of the inner spiral 218 to a second end of the inner spiral 218 opposite the first end 222. As the qualified technician gradually removes the inner spiral 218, the primary shim 216 is shrunk over the electrical insulation layer 204 and any grease 214.

The primary shim 216 can thus be positioned over at least a portion of the length of exposed electrical insulation layer 204. More specifically, the primary shim 216 can be positioned over a portion of the electrical insulation layer 204 extending from the cut end 224 of the outer semiconductive layer 208 to an exposed end 226 of the primary shim 216 so that a small portion of the insulation layer 204 (e.g., 5 mm in length of the insulation layer 204) may extend past the exposed end 226 of the primary shim 216. In some embodiments, the primary shim 216 may be about seventy-five mm in length. Furthermore, a portion of the electrical insulation layer 204 that the primary shim 216 does not encompass can be removed to expose the conductor 202.

Figure 4:
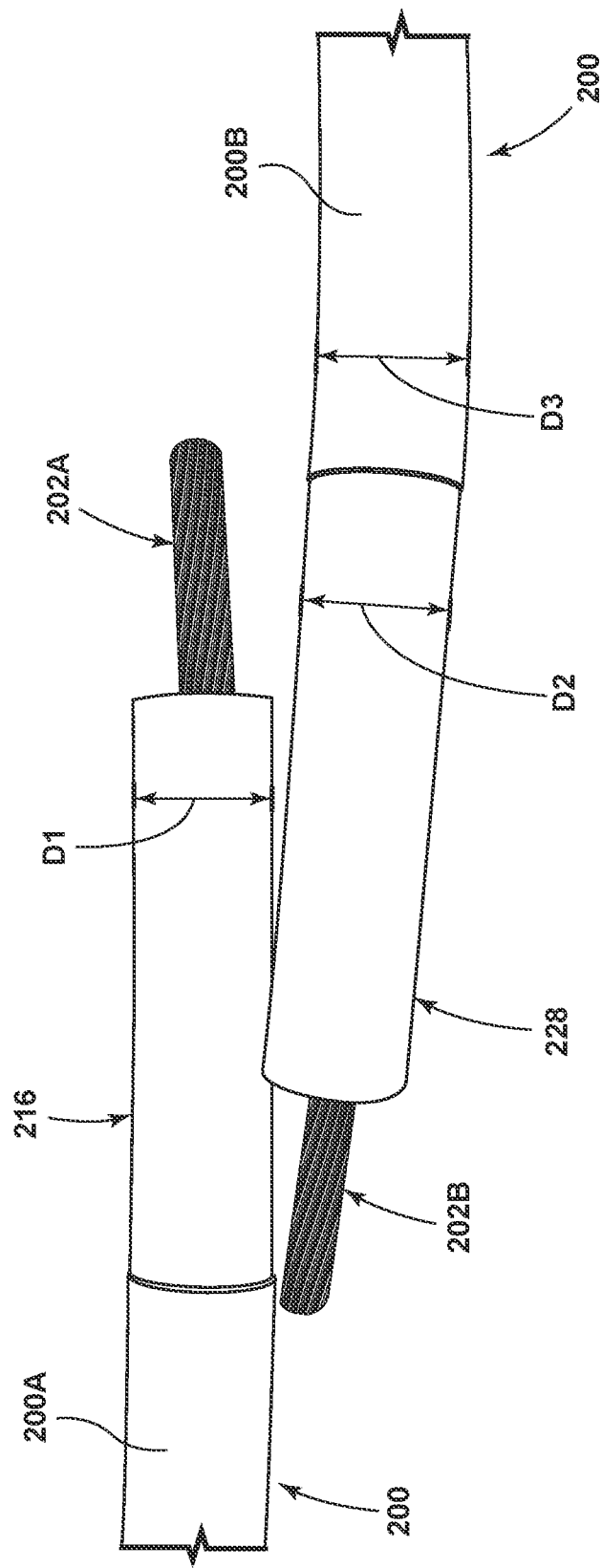
FIG. 4 is an isometric view of the first portion of the heating cable of FIG. 3 and a second portion of a heating cable according to some embodiments of the invention.

More specifically, FIG. 4 illustrates the first portion 200A of the heating cable 200 as well as a second portion 200B of a heating cable 200. The primary shim 216 is shown shrunk over the exposed electrical insulation layer 204 of the first portion 200A. The electrical insulation layer 204 and the inner semiconductive layer 206 that remain outside of the primary shim 216 can be stripped back to expose a first length 202A of the conductor 202. In some embodiments, the first length 202A can extend for a length sufficient for insertion into and electrical coupling with a connector (such as connector 234 shown in FIG. 6, described below), with minimal exposure of the conductor 202 outside of the connector.

Furthermore, the cold shrink splice 210 can include a secondary shim 228 that can be positioned over the electrical insulation layer 204 of the second portion 200B of the heating cable 200 (e.g., with grease (not shown) first applied to the electrical insulation layer 204). More specifically, along the second portion 200B, the outer semiconductive layer 208 can be removed to expose a length of the electrical insulation layer 204, grease 214 can be applied to at least a portion of the exposed length of electrical insulation layer 204, and the secondary skim 228 can be shrunk over the electrical insulation layer 204 and any grease 214. As noted above, the grease can fill in potential air pockets that could potentially exist between the shim 228 and the electrical insulation layer 204.

The secondary shim 228 can be substantially the same as the primary shim 216. In particular, the secondary shim 228 can be a cold shrink tube such as a silicone cold shrink tube. In some embodiments, the secondary shim 228 can be a push-on tubing or a heat shrink tubing. The secondary shim 228 can be shrunk over the electrical insulation layer 204 of the second portion 200B in the same manner as the primary shim 216 is shrunk over the electrical insulation layer 204 of the first portion 200A. Additionally, a second length 202B of the conductor 202 can be exposed and extend for approximately the same length as the first length 202A of the conductor 202.

Referring now to FIGS. 2-4 as well as FIG. 5, both the primary shim 216 and the secondary shim 228 can be sized appropriately to allow an outer cold shrink tube 230 of the splice 210 to cover and protect the heating cable 200. The outer cold shrink tube 230 can be a silicone cold shrink tube. The outer cold shrink tube 230 may be preformed to a predetermined shape and then pre-expanded over an inner spiral 232 that functions like the inner spiral 218 described above. The inner spiral 232 can also include a ripcord portion 233. Similar to the primary shim 216 and the secondary shim 228, as the inner spiral 232 is removed (e.g., using the ripcord portion 233), the outer cold shrink tube 230 shrinks. However, the outer cold shrink tube 230 may not shrink past the predetermined shape, limiting what the outer cold shrink tube 230 can form a suitable fit around.

If the primary shim 216, the secondary shim 228, and the outer semiconductive layer 208 do not have sufficiently large diameters, the outer cold shrink tube 230 may not be able to shrink far enough to form to the outer surfaces of the primary shim 216, the secondary shim 228, and the outer semiconductive layer 208 (e.g., form a sufficiently compressed seal around the primary shim 216, the secondary shim 228, and the outer semiconductive layer 208) and provide protection from elements such as water or other liquids. For example, a diameter D1 of the shrunk primary shim 216 (e.g., as shown in FIG. 4) and a diameter D2 of the shrunk secondary shim 228 (e.g., as shown in FIG. 4) can be approximately equal to a diameter D3 of the outer semiconductive layer 208. However, as long as the diameters D1 and D2 are within a predetermined margin of the diameter D3, for example a margin of one millimeter, the outer cold shrink tube 230 may be sized to shrink far enough to compress against the outer surfaces of the primary shim 216, the secondary shim 228, and the outer semiconductive layer 208 and provide protection from elements such as water or other liquids. Grease can also be applied to fill in potential air pockets that could potentially exist due to mismatches between D1 and D3 and/or D2 and D3. As noted above, if air pockets are not sufficiently eliminated, electrical discharges can occur, especially with cables that operate at about five thousand volts or higher.

Furthermore, referring now to FIGS. 2-5 as well as FIG. 6, the cold shrink splice 210 can further include a connector 234 such as a shear bolt connector. For example, the connector 234 can be a tin-plated aluminum shear bolt connector, a nickel-plated shear bolt connector, or a copper shear bolt connector. The connector 234 may also be a crimp connector. The connector 234 can accept the first length 202A and the second length 202B of each conductor 202 in order to electrically connect the conductors 202A, 202B.

In some embodiments, the connector 234 can include a body 236 and any number of fasteners that can secure the first length 202A and the second length 202B of the conductor 202 to the body 236. For example, the connector 234 can include a first fastener 238 and a second fastener 240. The first fastener 238 and the second fastener 240 may each be a bolt such as a breakaway bolt or a screw. The first fastener 238 and the second fastener 240 can each be turned or otherwise driven into the body portion 236 and against the first length 202A and the second length 202B, respectively, physically securing and electrically coupling the first length 202A and the second length 202B to the body 236 and, by extension, the connector 234. Thus, the connector 234 can electrically couple the first portion 200A of the heating cable 200 to the second portion 200B of the heating cable.

The outer cold shrink tube 230 can be sized large enough to fit over the connector 234 as well as be able to shrink far enough to squeeze or compress against the outer surfaces of the primary shim 216, the secondary shim 228, and the outer semiconductive layer 208 as described above. The presence of the primary shim 216 and the secondary shim 228 can reduce how far the outer cold shrink tube 230 is required to shrink as compared to a splice that does not include the shims 216, 228. Thus, a wider range of cold shrink tubes can be used as the outer cold shrink tube 230 because the shrinkage requirements are reduced, which may also result in a more cost-efficient splice 210 and/or allow the use of an already existing commercial cold shrink tube.

Figure 7:
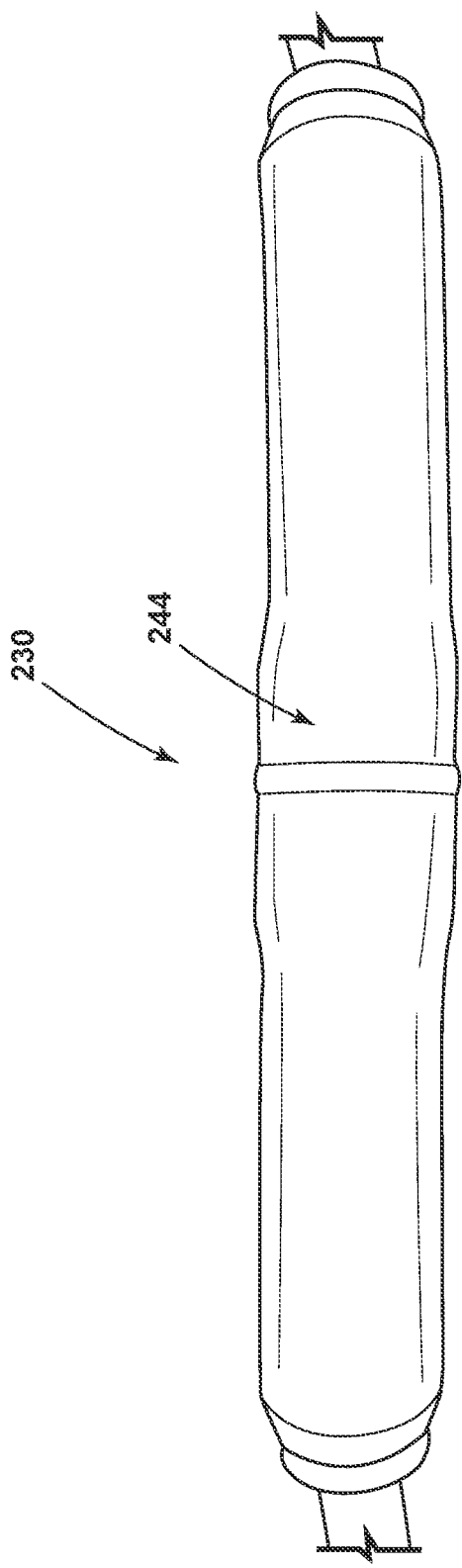
FIG. 7 is an isometric view of the outer cold shrink tube of FIG. 5 after installation.

Referring now to FIGS. 2-6 as well as FIG. 7, the outer cold shrink tube 230 can be positioned over the primary shim 216, the secondary shim 228, the connector 234, and at least a portion of the outer semiconductive layer 208 and shrunk by removing the inner spiral 232 as described above. Before the outer cold shrink tube 230 is shrunk, another layer of grease (not shown) can be applied to the outer surfaces of the primary shim 216, the secondary shim 228, and the connector 234 to eliminate potential air pockets. The splice 210 can thus include the grease applied to the outer surfaces of the primary shim 216, the secondary shim 228, and the connector 234. The outer cold shrink tube 230, and by extension the splice 210, may then provide protection against elements such as water to the conductor 202 and the connector 234.

Additionally, in some embodiments, the outer cold shrink tube 230 can include an outermost semiconductive layer 244 that can prevent or reduce electrical discharge that may occur in the cold shrink splice. Certain cables, such as in-line skin effect heating cables that operate at or above five thousand volts, may include an outer semiconductive layer (e.g., the outer semiconductive layer 108 shown in FIG. 1) that contacts the inner surface of a heat tube being heated, and reduces or eliminates corona or partial discharge without interfering with the electrical relationship between the in-line skin effect heating cable and the heat tube that enables skin-effect heating. The heat tube acts as a ground for the outer semiconductive layer. Thus, to reduce or eliminate discharge in the splice 210, the outermost semiconductive layer 244 of the outer cold shrink tube 230 can be placed in electrical communication with a suitable ground. For example, the splice 210 can be placed in electrical communication with a heat tube via a pull box 264.

Figure 8:
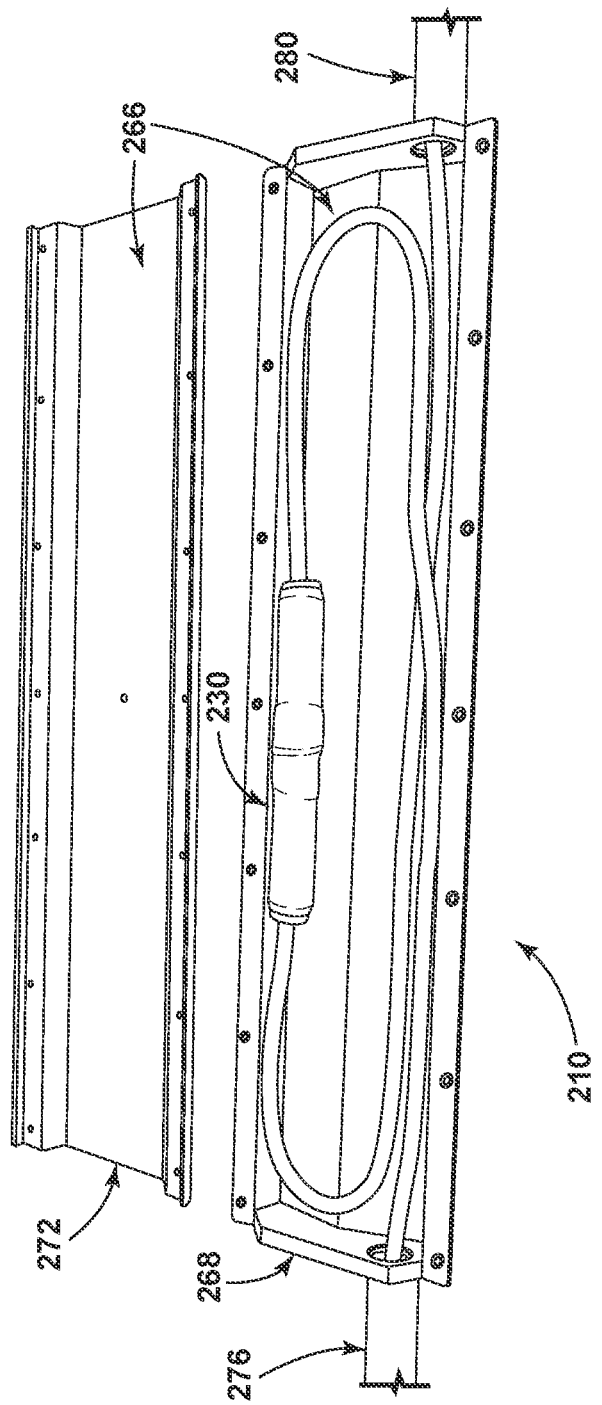
FIG. 8 is an isometric view of a pull box having a top portion removed from a bottom portion, according to some embodiments of the invention.
Figure 9:
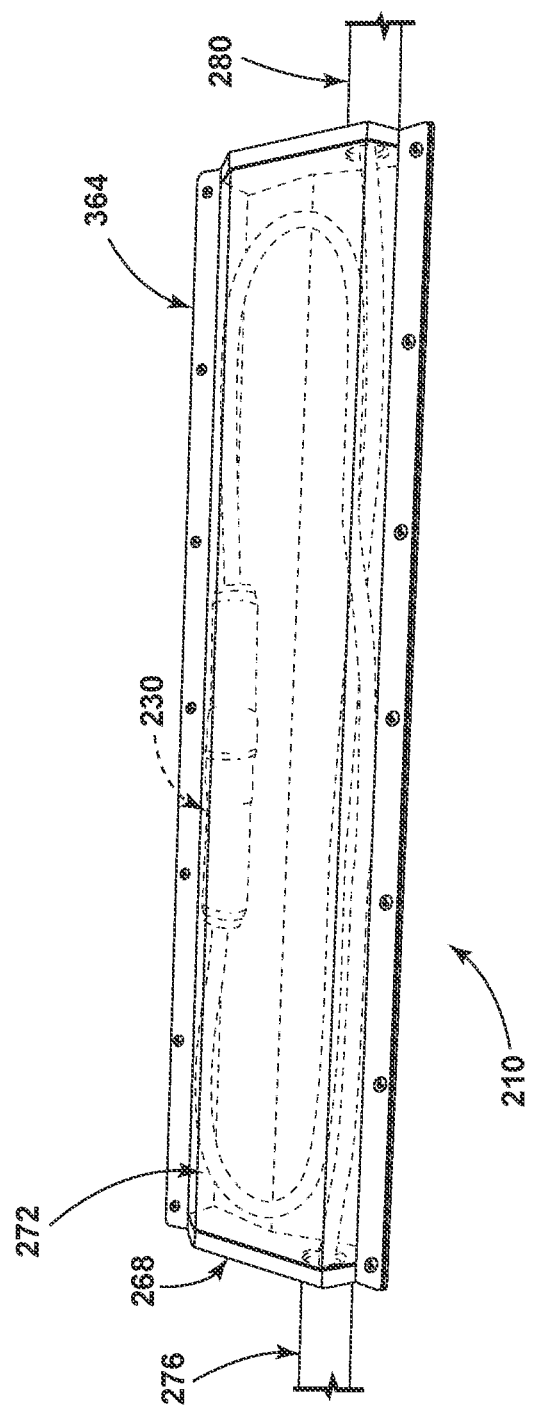
FIG. 9 is an isometric view of the pull box of FIG. 8 having the top portion affixed to the bottom portion.

More specifically, FIG. 8 illustrates a pull box 264 having a top portion 272 and a bottom portion 268. As shown in FIG. 8, the top portion 272 may be removed and the bottom portion 268 may receive the cold shrink splice 210. FIG. 9 illustrates the pull box 264 having the top portion 272 affixed to the bottom portion 268, and with the cold shrink splice 210 positioned in the pull box 264. Furthermore, in FIG. 9, the location of the cold shrink splice 210, the first portion 200A of the heating cable 200, and the second portion 200B of the heating cable 200 inside the pull box is indicated with dotted lines.

In some applications, the pull box 264 can be welded to a first heating tube 276 and a second heating tube 280. The first heating tube 276 and the second heating tube 280 can form a larger heating tube that transfers heat to a pipeline (e.g., an oil pipeline, a Sulphur pipeline, etc.). The pull box 264 can completely enclose the cold shrink splice 210. The splice 210, in combination with the pull box 264, may form a splice system for heating cables 200, such as skin-effect heating cables. The pull box 264, due to the welded connected, is thus in electrical communication with the heating tubes 276, 280 and the heating tubes 276, 280 can act as a ground for the cold shrink splice 210.

For example, the pull box 264 is generally metallic and electrically conductive. In some embodiments, an interior surface 266 of the pull box 264 is not be painted or otherwise treated to reduce or eliminate the conductivity inside the pull box 264. When the outermost semiconductive layer 244 of the outer cold shrink tube 230 is in contact with the interior surface 266 of the pull box 264 (and, thus, in direct electrical communication with the pull box 264), and the pull box 264 is in electrical communication with the heating tubes 276, 280, the outer cold shrink tube 230 can reduce or eliminate discharge in similar fashion to an outer semiconductive layer (e.g., the outer semiconductive layer 108 shown in FIG. 1) of the heating cable 200.

Another method to achieve grounding in some embodiments is to place the outer semiconductive layer 244 of the outer cold shrink tube 230 in electrical communication with the outer semiconductive layer 208 of the heating cable 200. To implement this method, a conductive jumper such as a strip of conductive tape, a metallic braid, or a conductive wire sock can be positioned between the outer semiconductive layer 244 of the outer cold shrink tube 230 and the outer semiconductive layer 208 of the heating cable 200.

Figure 10:
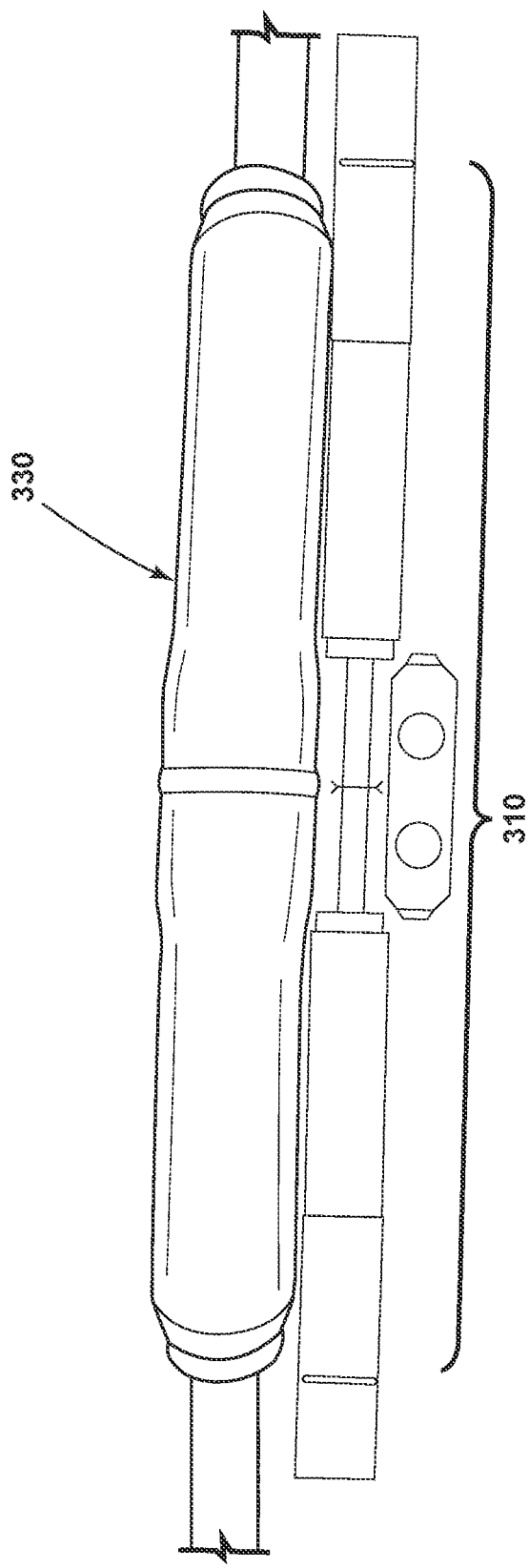
FIG. 10 is a side view of another exemplary splice according to some embodiments of the invention.
Figure 11:
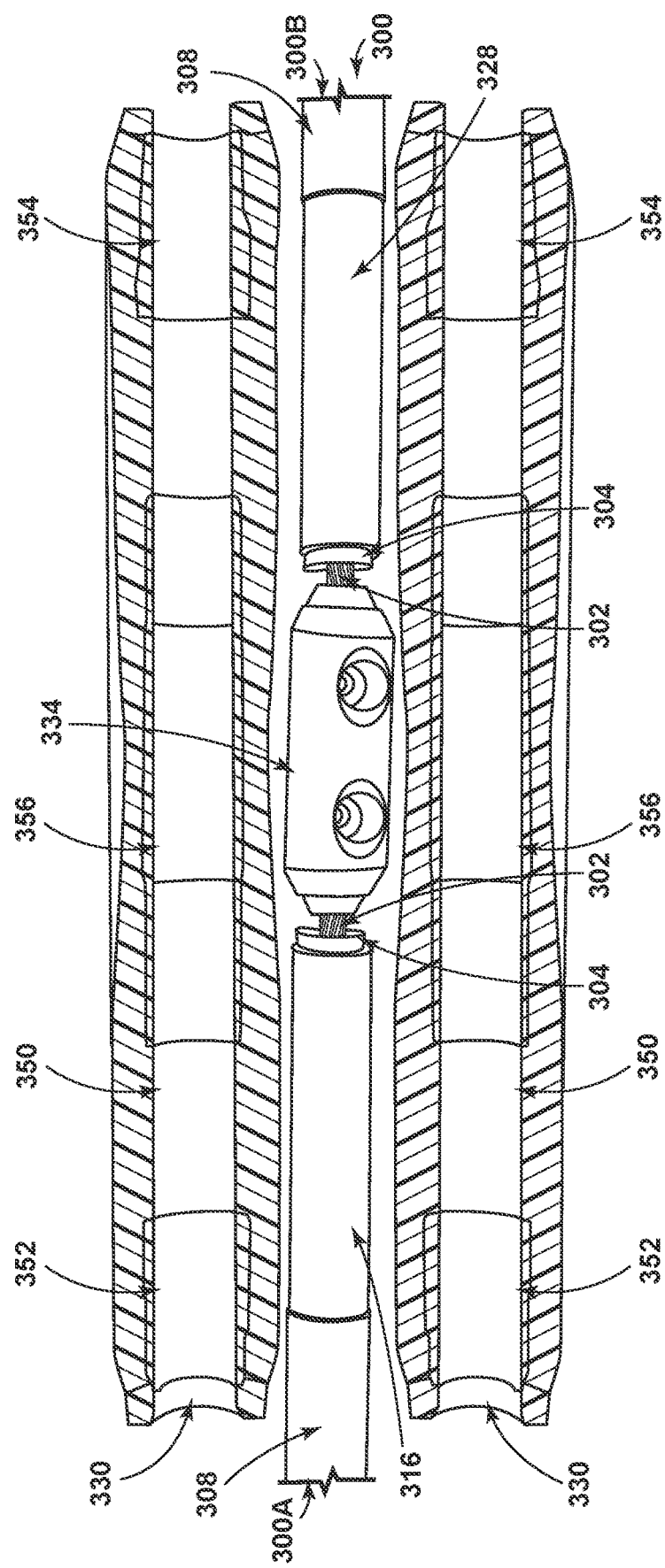
FIG. 11 is a longitudinal cross-sectional view of an outer cold shrink tube in FIG. 10 as well as the components included in the cold shrink splice of FIG. 10 after installation.
Figure 12:
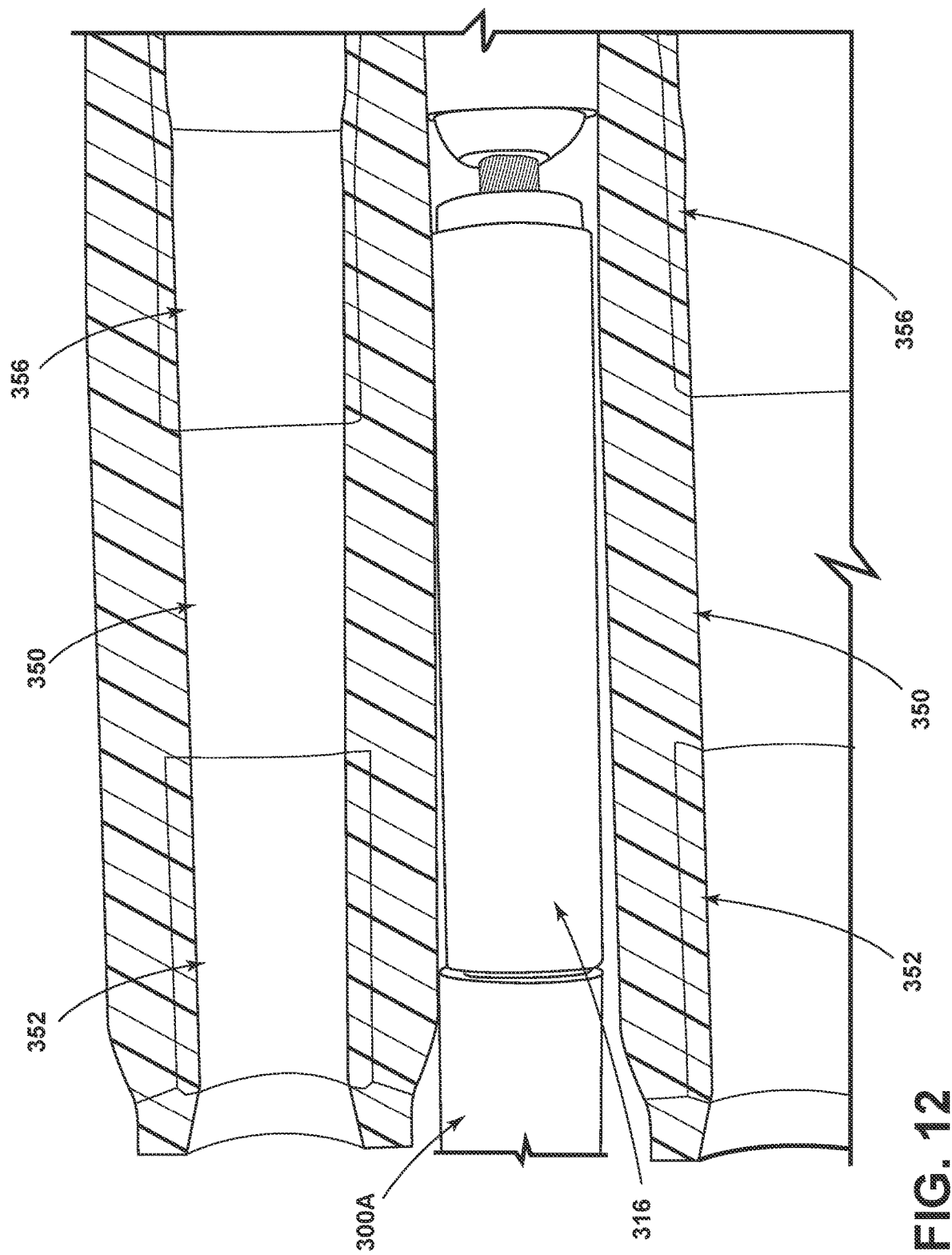
FIG. 12 is a side view of a primary shim included in the cold shrink splice of FIG. 10.

FIGS. 10-12 illustrate another cold shrink splice 310, according to some embodiments, for joining a first portion 300A of a heating cable 300 and a second portion 300B of the heating cable 300 having a conductor 302, an insulation layer 304, and an outer semiconductive layer 308. The cold shrink splice 310 can include one or more of the components of the splice 210 shown in FIGS. 2-7. In particular, the cold shrink splice 310 can include an outer cold shrink tube 330 that may be substantially the same as the outer cold shrink tube 230 described above, a primary shim 316 that may be substantially the same as the primary shim 216 described above, a secondary shim 328 that may be substantially the same as the secondary shim 228 described above, and a connector 334 that may be substantially the same as the connector 234 described above. FIG. 10 illustrates the cold shrink splice 310 after installation, in particular with the outer cold shrink tube 330 covering other components of the cold shrink splice 310.

FIGS. 11 and 12 illustrate the installed cold shrink splice 310, having the outer cold shrink tube 330 broken and removed to show other components of the cold shrink splice 310, including the connector 334, the primary shim 316, and the secondary shim 328. The outer cold shrink tube 330 can include a semiconductive layer on an outer surface thereof, as described above. Furthermore, as shown in FIGS. 11 and 12, the outer cold shrink tube 330 can include a first stress cone 352, a second stress cone 354, and a connector interface 356 along an interior thereof. In some embodiments, the first stress cone, the second stress cone, and the connector interface may also be included in the outer cold shrink tube 230 of FIG. 7. The portions of the outer cold shrink tube 330 not including the first stress cone 352, the second stress cone 354, the connector interface 356, and the semiconductive coating can include an insulator material 350. FIG. 12 illustrates a closer view of the first stress cone 352 and the connector interface 356.

The connector interface 356 and the stress cones 352, 354, can each include the same semiconductive material, which may be a semiconductive silicone. The connector interface 356 can be positioned over and placed in contact with the connector 334. For example, the connector 334 can be a compression connector comprising a metal or semiconductive collar, providing an electrical connection between the connector 334 and the semiconductive connector interface 356. Furthermore, the first stress cone 352 can be in contact with both the primary shim 316 and the outer semiconductive layer 308 of the first cable portion 300A. The second stress cone 354 can be in contact with both the secondary shim 328 and the outer semiconductive layer 308 of the second cable portion 300B.

The connector 334 can be centered and in contact with the connector interface 356 and not the insulator material 350. More specifically, the connector interface 356, because it is in electrical contact with the connector 334, is at the operating voltage of the heating cable during operation of the heating cable. On the other hand, the stress cones 352, 354 are at ground potential due to their electrical connection with the outer semiconductive layer of the cable. The section of insulator material 350 between the connector interface 356 at operating voltage and the stress cones 352, 354 at ground potential has sufficient creepage distance and insulation thickness to withstand high electric stress in the region. The stress cones 352, 354 can therefore reduce the high electrical stress that occurs at the semiconductive edge of the cable 300.

Figure 13:
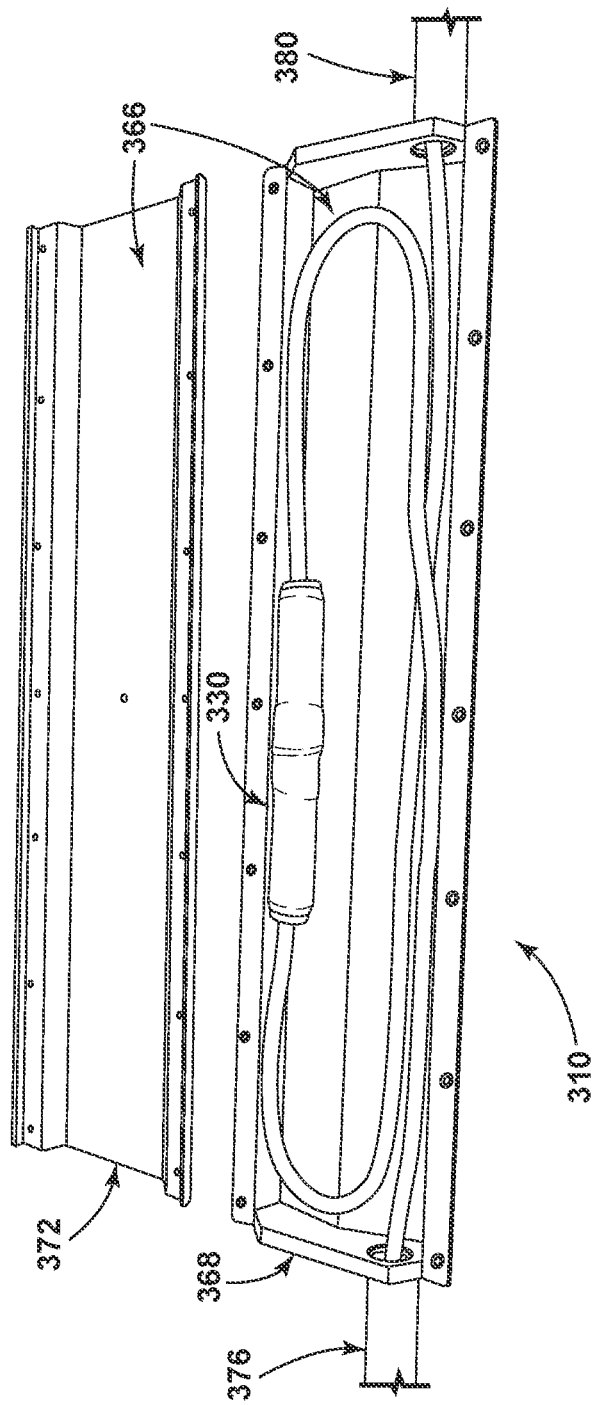
FIG. 13 is an isometric view of another pull box having a top portion removed from a bottom portion, and the cold shrink splice of FIG. 10 being arranged in the bottom portion according to some embodiments of the invention.
Figure 14:
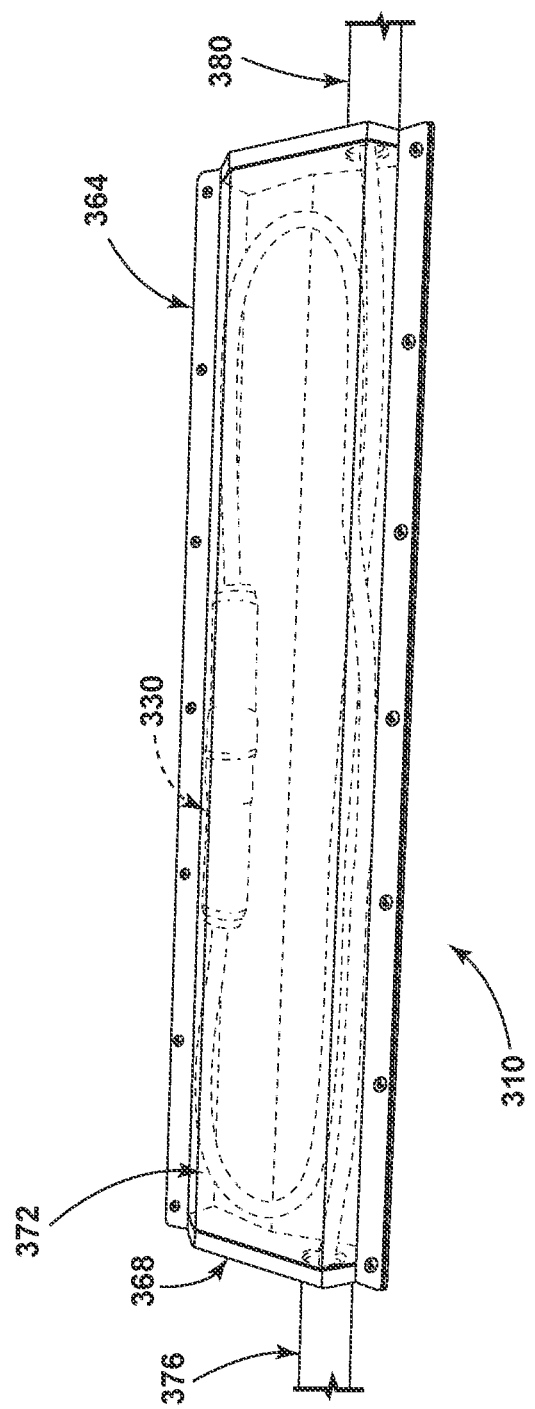
FIG. 14 is an isometric view of the pull box of FIG. 13 having the top portion affixed to the bottom portion.

FIG. 13 illustrates a pull box 364 having a top portion 372 removed and having the cold shrink splice 310 placed in a bottom portion 368 thereof, similar to the pullbox 264 of FIG. 8. FIG. 14 illustrates the pull box 364 having the top portion 372 affixed to the bottom portion 368, and with the cold shrink splice 310 positioned in the pull box 364. Furthermore, in FIG. 14, the location of the cold shrink splice 310, the first portion 300A of the heating cable 300, and the second portion 300B of the heating cable 300 inside the pull box 364 is indicated with dotted lines. The splice 310, in combination with the pull box 364, may form a splice system for heating cables 300, such as skin-effect heating cables.

The pull box 364 can be welded to a first heating tube 376 and a second heating tube 380 and, therefore, is in electrical communication with the heating tubes 376, 380. The first heating tube 376 and the second heating tube 380 can form a larger heating tube that transfers heat to a pipeline (e.g., an oil pipeline, a Sulphur pipeline, etc.). The pull box 364 can completely enclose the cold shrink splice 310, and the heating tubes 376, 380 can act as a ground for the cold shrink splice 310.

More specifically, like the pull box 264 described above, the pull box 364 is generally metallic and electrically conductive. In some embodiments, an inner surface 366 of the pull box 364 is not be painted or otherwise treated to reduce or eliminate the conductivity inside the pull box 364. When the outer semiconductive layer 344 of the outer cold shrink tube 330 is in contact with the inner surface 366 of the pull box 364, and the pull box 364 is in electrical communication with the heating tubes 376, 380, the outer cold shrink tube 330 can reduce or eliminate discharge in similar fashion to the outer semiconductive layer (e.g., the outer semiconductive layer 108 shown in FIG. 1) of the heating cable 300.

Another method in some embodiments is to place the outer semiconductive layer 344 of the outer cold shrink tube 330 in electrical communication with the outer semiconductive layer 308 of the heating cable 300. To implement this method, a conductive jumper such as a strip of conductive tape, a metallic braid or a conductive wire sock can be positioned between the outer semiconductive layer 344 of the outer cold shrink tube 330 and the outer semiconductive layer 308 of the heating cable 300.

In light of the above, in some embodiments, a method for installing the cold shrink splice 310 can include removing (e.g., by stripping) the outer semiconductive layer 308 along the first portion 300A of the heating cable 300 to expose a predetermined length of insulation layer 304 and installing the primary shim 316 over the insulation layer 304. The predetermined length can be approximately equal to a length of the primary shim 316 plus a second predetermined length that the conductor 302 needs to be exposed for insertion into the connector 334. The predetermined length can be slightly (e.g., ten percent) longer than the length of the primary shim 316 plus the second predetermined length.

The method can include further removing the insulation layer 304 to expose the conductor 302 for the second predetermined length. The method can include installing the secondary shim 328 on the second portion 300B and exposing a length of the conductor 302 included in the second portion 300B in the same fashion as the primary shim 316 and exposed conductor 302 in the first portion.

The method can include electrically coupling the first portion 300A to the second portion 300B by connecting the conductors 302 of the first portion 300A and the second portion 300B via the connector 334. The method can include positioning and installing (e.g., by shrinking) the outer cold shrink tube 330 over the connector 334, the primary shim 316, and the secondary shim 328. Before installing the outer cold shrink tube 330, the connector interface 356 can be positioned over the connector 334, the first stress cone 352 can be positioned over both the primary shim 316 and the outer semiconductive layer 308 of the first portion 300A, and the second stress cone 354 can be positioned over both the secondary shim 328 and the outer semiconductive layer 308 of the second cable portion 300B.

After the outer cold shrink tube 330 is shrunk, the connector interface 356 can be in contact (e.g., electrical contact) with the connector 334, the first stress cone 352 can be in contact with both the primary shim 316 and the outer semiconductive layer 308 of the first portion 300A, and the second stress cone 354 can be in contact with both the secondary shim 328 and the outer semiconductive layer 308 of the second cable portion 300B.

After installation, the method can include placing the cold shrink splice 310, and more specifically the outer cold shrink tube 330, in the bottom portion 368 of the pull box 364. The method can include fastening the top portion 372 of the pull box 364 to the bottom portion 368. In some embodiments, the method can include pulling the first portion 300A and the second portion 300B through the first heating tube 376 and the second heating tube 380, respectively, and positioning cut ends of the first portion 300A and the second portion 300B in and/or near the pull box before installing the cold shrink splice 310. Additionally, the method can include welding the pull box 364 to the heating tubes 376, 380.

As described above, the splice 210/310 of some embodiments can include a primary shim, a secondary shim, grease applied between a length of electrical insulation layer and the primary shim, grease applied between a length of electrical insulation layer and the secondary shim, the connector, the outer cold shrink tube, and any grease that covers the primary shim, the secondary shim, and the connector. The selection of these components, along with the material properties of these components, enables the splice to cost-efficiently, electrically couple high voltage heating cables such as in-line skin-effect heating cables, to be easily installed by a qualified technician, and to resist relatively high temperatures.

Notably, the splice does not require the use of tape when cold shrink tubing is used as the primary shim, the secondary shim, and the outer cold shrink tube. For example, installing tape is generally labor intensive and craft intensive, and splices that include tape can be more difficult to install than splices that include cold shrink tubing. Additionally, in some embodiments, the connector can be a shear bolt connector, which may be installed more easily than other connector types such as crimp connectors.

Furthermore, the size of the splice can provide a cost-efficient splice solution. Referring back to FIG. 7, the diameter of the splice 210 is only slightly larger at the portion of the cold shrink tube 230 that is positioned over the connector 234. Thus, utilizing a shear bolt connector having a diameter close to that of cable 100 as the connector 234 can reduce the size of the splice 210 in comparison to other splices that utilize other connectors. The relatively smaller size of the splice 210 can allow the splice 210 to be positioned in a smaller (and potentially less expensive) pull box than other splices, potentially reducing costs for the consumer. The splice 210 also does not require a molded push-on tube (e.g. a silicone push-on tube), which may be difficult to install reliably.

The splice of certain embodiments can also be rated for higher temperatures than other commercially available splices. More specifically, the above-described primary shim, the secondary shim, and the outer cold shrink tube can include silicone, and may therefore be rated for higher temperatures (e.g., 150° C.) than components included in other commercial splice kits. For example, commercial EPDM push-on tubes are generally only rated to about 90-105° C. As another example, many commercially available semiconductive mastics or tapes are not rated for use up to 150° C. Thus, the splice can be configured to resist higher temperatures than other splice kits.

The splice of some embodiments can also be used for certain skin-effect heating cables, such as in-line skin-effect heating cables, that other splice kits are not suitable for. For example, some splice kits cannot be used with skin-effect heating cables because these splice kits utilize an outer metallic ground. Furthermore, currently available splices are not suitable for in-line skin-effect heating cables due to size limitations (e.g., do not fit within pull boxes or cannot adequately shrink to skin-effect heating cable diameters). The splice described herein is configured to operate with skin-effect heating cables and fit within a pull box, thus providing an improvement over existing splices. The primary shim, secondary shim, and outer cold shrink tube allow electrical contact between the splice and the pull box and, further, the heat tubes welded to the pull box, which allows for necessary electrical discharge during operation of the heater cable.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A splice system for a skin-effect effect heating cable having an insulation layer and comprising a first portion at least partially disposed in a first heating tube and a second portion at least partially disposed in a second heating tube, the splice system comprising:
- a splice comprising:
  - a primary cold shrink shim shrunk over a first length of the insulation layer of the first portion of the heating cable;
  - a secondary cold shrink shim shrunk over a second length of the insulation layer of the second portion of the heating cable;
  - a connector electrically coupled to a first conductor of the first portion of the heating cable and a second conductor of the second portion of the heating cable; and
  - an outer cold shrink tube comprising an outer semiconductive layer, the outer cold shrink tube shrunk over the primary cold shrink shim, the secondary cold shrink shim, and the connector; and
- a metallic pull box welded to and in electrical communication with the first heating tube and the second heating tube, the metallic pull box housing the splice, and in electrical communication with the outer semiconductive layer of the outer cold shrink tube.

2. The splice system of claim 1, wherein the connector is a shear bolt connector.

3. The splice system of claim 1, wherein the primary shim comprises a cold shrink silicone tube.

4. The splice system of claim 1, wherein the secondary shim comprises a cold shrink silicone tube.

5. The splice system of claim 1, wherein the outer cold shrink tube is a cold shrink silicone tube.

6. The splice system of claim 1, wherein the skin-effect heating cable operates at or above five thousand volts.

7. The splice system of claim 1, wherein the skin-effect effect heating cable operates at or above ten thousand volts.

8. The splice system of claim 1, wherein the outer semiconductive layer of the outer cold shrink tube is in electrical contact with an outer semiconductive layer of the heating cable.

9. The splice system of claim 1, wherein a shrunk diameter of the primary cold shrink shim is approximately equal to a diameter of the outer semiconductive layer of the heating cable.

10. The splice system of claim 1, wherein the primary shim, the secondary shim, and the outer cold shrink tube comprise materials that are rated for at least 150° Celsius.

11. The splice system of claim 1, wherein the heating cable comprises a conductor sized equal to or smaller than two American wire gauge.

12. The splice system of claim 1, wherein the connector is a compression connector comprising a metal or semiconductive collar providing an electrical connection between the connector and a connector interface of the outer cold shrink tube.

13. The splice system of claim 1, wherein the heating cable comprises an outer semiconductive layer and the outer cold shrink tube comprises:
- a connector interface in contact with the connector;
- a first stress cone in contact with the primary shim and the outer semiconductive layer of the first portion of the heating cable; and
- a second stress cone in contact with the primary shim and the outer semiconductive layer of the second portion of the heating cable.

14. A splice for a skin-effect effect heating cable including an insulation layer and disposed in a heating tube, the splice comprising:
- a primary cold shrink shim shrunk over a first length of the insulation layer of a first portion of the heating cable;
- a secondary cold shrink shim shrunk over second length of the insulation layer of a second portion of the heating cable;
- a connector electrically coupled to a conductor of the first portion of the heating cable and a conductor of the second portion of the heating cable; and
- an outer cold shrink tube shrunk over the primary cold shrink shim, the secondary cold shrink shim, and the connector, and in electrical contact with a metallic pull box in electrical communication with the heating tube.

15. The splice of claim 14, wherein the outer cold shrink tube comprises an outer semiconductive layer in electrical contact with an outer semiconductive layer of the heating cable.

16. The splice of claim 14, wherein the connector is a shear bolt connector.

17. A method for installing a cold shrink splice on a skin effect heating cable, the method comprising:
- removing an outer semiconductive layer along a first portion of the heating cable to expose a first length of an insulation layer of the heating cable;
- installing a primary shim over at least a portion of the first length of the insulation layer;
- removing the outer semiconductive layer along a second portion of the heating cable to expose a second length of the insulation layer of the heating cable;
- installing a secondary shim over at least a portion of the second length of the insulation layer;
- installing a cold shrink tube over the primary shim and the secondary shim; and
- placing the cold shrink tube in electrical contact with a pull box.

18. The method of claim 17 and further comprising coupling the first portion of the heating cable to the second portion of the heating cable with a connector.

19. The method of claim 18 and further comprising:
- arranging a connector interface of the cold shrink tube over the connector;
- arranging a first stress cone of the cold shrink tube over the primary shim and the outer semiconductive layer; and
- arranging a second stress cone of the cold shrink tube over the secondary shim and the outer semiconductive layer.

20. The method of claim 17 and further comprising greasing the portion of the first length of the insulation layer prior to installing the primary shim.

* * * * *